United States Patent [19]

Bordner

[11] 4,330,811

[45] May 18, 1982

[54] FILAMENT-REINFORCED PLASTIC ARTICLE

[75] Inventor: Dalton W. Bordner, Fullerton, Calif.

[73] Assignee: Ameron, Inc., Monterey Park, Calif.

[21] Appl. No.: 78,039

[22] Filed: Sep. 24, 1979

Related U.S. Application Data

[63] Continuation-in-part of Ser. No. 892,737, Apr. 3, 1978, abandoned.

[51] Int. Cl.³ .............................................. H02G 15/08
[52] U.S. Cl. ........................................ 361/212; 174/47
[58] Field of Search ....................... 361/212, 215, 220; 174/47; 138/39

[56] References Cited

U.S. PATENT DOCUMENTS

| | | | |
|---|---|---|---|
| 2,723,705 | 11/1955 | Collins | 154/1.7 |
| 3,070,132 | 12/1962 | Sheridan . | |
| 3,499,815 | 3/1970 | Hof | 156/431 |
| 3,519,520 | 7/1970 | Newman, Jr. . | |
| 3,555,170 | 1/1971 | Petzetakis . | |
| 3,580,983 | 5/1971 | Jackson . | |
| 3,603,719 | 9/1971 | Lejeune . | |
| 3,828,112 | 8/1974 | Johansen et al. . | |
| 3,860,742 | 1/1975 | Medney | 174/84 |
| 3,958,066 | 5/1976 | Imamura et al. | 428/372 |
| 3,963,856 | 6/1976 | Carlson et al. . | |
| 4,059,847 | 11/1977 | Phillips et al. . | |
| 4,108,701 | 8/1978 | Stanley . | |

FOREIGN PATENT DOCUMENTS

| | | | |
|---|---|---|---|
| 1088295 | 9/1960 | Fed. Rep. of Germany | 174/47 |
| 1159711 | 12/1963 | Fed. Rep. of Germany . | |
| 903414 | 8/1962 | United Kingdom | 138/139 |

OTHER PUBLICATIONS

Bigg, D.M., "Conductive Polymeric Compositions" *Polymer Engineering & Science*, vol. 17, No. 12, 1977.

*Primary Examiner*—Miller J. D.
*Assistant Examiner*—L. Schroeder
*Attorney, Agent, or Firm*—Christie, Parker & Hale

[57] ABSTRACT

A filament-reinforced plastic article has a fluid-impermeable wall with a relatively low surface resistivity to prevent buildup of dangerous electrostatic charge. The article includes overlapping bands of filaments coated with plastic. A minor portion of the filaments in at least some of the bands is electrically conductive so that electrically conductive filaments are distributed throughout the wall.

16 Claims, 4 Drawing Figures

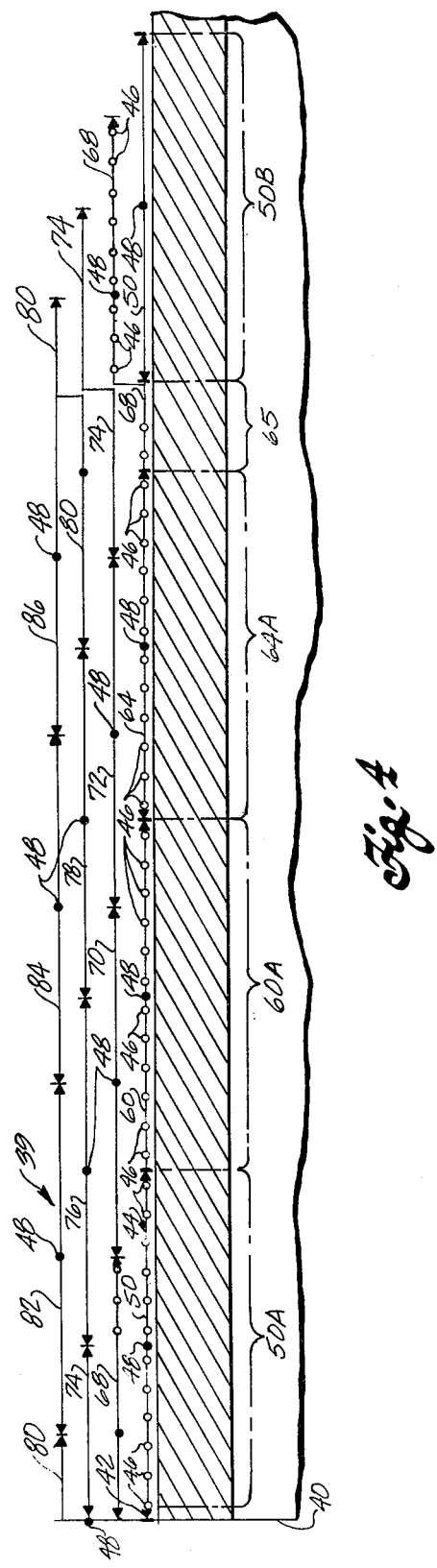

FILAMENT-REINFORCED PLASTIC ARTICLE

CROSS-REFERENCE TO RELATED APPLICATION

This is a continuation-in-part of application Ser. No. 892,737, filed Apr. 3, 1978, entitled "Filament-Reinforced Plastic Article", now abandoned.

BACKGROUND OF THE INVENTION

This invention relates to improved electrically conductive, filament-reinforced plastic articles, such as plastic sheets and pipe.

Plastic pipe has been used for many years to provide corrosion-proof conduits in many different types of industries. A disadvantage of prior art plastic pipe is that it can develop a dangerous electrostatic charge because of its low electrical conductivity. For example, Lloyd's of London requires that all fiberglass pipe used to handle petroleum products on board ship have a surface resistivity of less than $10^9$ ohms (when tested in accordance with ASTM D257-76) so that static charges built up in the pipe by fluid flow may be conducted to ground. Conventional fiberglass-reinforced pipe made before this invention has a surface resistivity of about $10^{12}$ ohms, and therefore is unsatisfactory for such applications. Economically priced, electrically conductive plastic sheets would also find wide use to shield against radio frequency electromagnetic radiation.

Before this invention, conductive materials, such as graphite, carbon, silver, aluminum, and copper powder and particles, have been incorporated into rubber and plastic products to make them more conductive to prevent static charge buildup, or to make radio frequency shields. Chopped metallic fibers and chopped conductive glass filaments have also been used in plastic products to increase electrical conductivity. The article entitled "Conductive Polymeric Compositions" in *Polymer Engineering and Science*, December 1977, Vol. 17, No. 12, discloses the use of conductive fibers, spheres, flakes, and irregular particulates of conductive materials to increase the thermal and electrical conductivity of plastic articles. The article states that fibrous conductors improve conductivity more significantly than spheres, flakes, or irregular particles. However, the article limits its disclosure to particles and short glass fibers having a maximum aspect ratio of no more than approximately 35:1. The aspect ratio is the ratio of the length of a conductive member to its diameter. Moreover, the use of conductive powder, particles, and chopped filaments is expensive, because relatively large amounts of these materials are required to achieve the necessary modification of electrical conductivity.

Thus, although the advantages of electrically conductive plastic have long been known, their use has been limited in many applications, because they have not been economically feasible before this invention.

In making conventional filament-reinforced plastic pipe, hundreds of filaments of reinforcing material, such as fiberglass, nylon, etc., are combined to form an "end" or roving. About 15 ends are combined to form a "strand", which includes several thousand individual filaments; and between about ten and about 40 strands are combined to form a tape, web, or band, which is saturated with liquid resin to coat the individual filaments with plastic. The resin-saturated band is wound onto a rotating mandrel. The winding path is usually a simple helix at an angle of about 54° to the mandrel axis of rotation. A uniformly reinforced pipe wall is formed by winding the band in overlapping helices, first to the right along the mandrel and then to the left. The filaments are substantially continuous, unidirectional fibers, and may be mineral fibers, such as glass or asbestos; animal fibers, such as wool; vegetable fibers, such as cotton; or synthetic fibers, such as nylon, rayon, dacron, orlon, and the like.

The resin or adhesive used to impregnate the band and wet the filaments can be any suitable thermosetting or thermoplastic resin used in winding or laminating procedures. For example, binders containing a thermosetting resin, such as epoxy, polyester, vinyl ester, furan, phenol-formaldehyde, or the like, or binders containing a thermoplastic resin, such as polyvinyl chloride, polyvinylidene chloride, or the like can be used.

U.S. Pat. No. 3,499,815 to Hof, and U.S. Pat. No. 3,519,520 to Newman describe apparatus and methods for making conventional fiber-reinforced plastic pipe. Such pipe is satisfactory under many conditions where resistance to corrosion is required, but it is of limited use where buildup of electrostatic charge creates a hazardous condition.

U.S. Pat. No. 3,070,132 to Sheridan; U.S. Pat. No. 3,555,170 to Petzetakis; U.S. Pat. No. 3,580,983 to Jackson; U.S. Pat. No. 3,958,066 to Imamura et al; and U.S. Pat. No. 3,963,856 to Carlson et al describe various conventional ways of increasing the thermal and electrical conductivity of plastic products by using metal wires or particles of metal or carbon imbedded in the product. As indicated above, this technique is expensive and has not been widely used to produce plastic pipes, for example, on a commercial basis.

SUMMARY OF THE INVENTION

This invention provides a relatively inexpensive filament-reinforced plastic material with a sufficiently high electrical conductivity to satisfy safety requirements for use in plastic pipe on board ship, and to make effective shields against radio frequency electromagnetic radiation.

The filament-reinforced plastic article of this invention includes a fluid-impermeable wall made of overlapping bands of continuous filaments coated with plastic. A minor portion of the filaments in at least one of the bands is metal-coated to make them electrically conductive. This provides a plastic article which has a surprisingly high electrical conductivity, and yet contains very little metal.

Preferably, the filaments are fiberglass, and the electrically conductive filaments carry a thin coating of metal on the exterior surface.

In the preferred method of the invention for making the articles, the bands of conventional and electrically conductive continuous filaments coated with liquid resin are wound around a mandrel in overlapping helical patterns to form a tubular reinforced wall of the desired thickness. If the final product is to be fiber-reinforced plastic pipe, the resin is cured to a sufficiently rigid condition on the mandrel to permit its removal without losing its tubular shape.

If the final product is to be a sheet of fiber-reinforced plastic which may be molded into a shield against radio frequency electromagnetic radiation, the curing of the resin on the mandrel is stopped short of completion, so the wall of the article is still flexible. While still on the mandrel, the wall of the tubular article or laminate is cut through along a line parallel to the longitudinal axis of the mandrel to make a sheet which can be formed and cured into a rigid article of the desired shape. The tubular wall can also be cut in other directions. For example, it can be cut in a spiral along a line perpendicular to the bands to form a bias tape.

DESCRIPTION OF THE DRAWINGS

FIG. 4 is an enlarged schematic cross-sectional view of an alternate embodiment of this invention.

DESCRIPTION OF THE PREFERRED EMBODIMENTS

Figure 1:
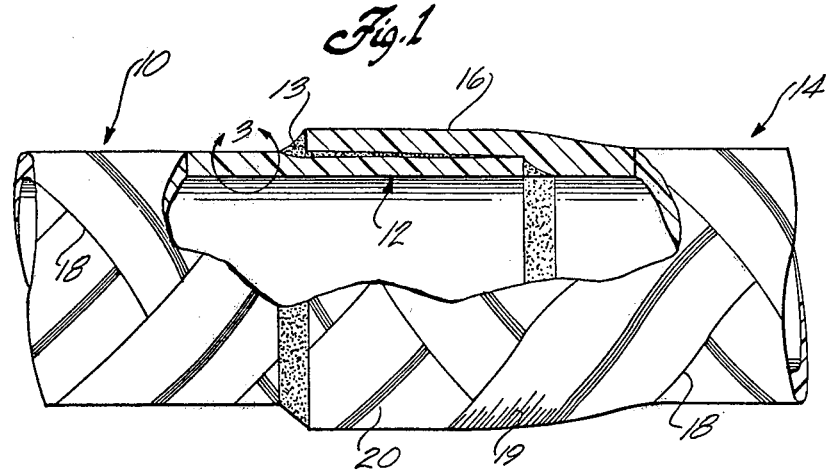
FIG. 1 is a fragmentary elevation, partly broken away, of two adjacent ends of sections of pipe made in accordance with this invention and bonded together with a conductive adhesive.

Referring to FIG. 1, a first pipe section 10, having a male end 12, is bonded by a layer 13 of adhesive to a second pipe section 14, having a female end 16. The adhesive layer is conventional epoxy resin which includes about 7% by weight of conductive filaments chopped to a length of about $\frac{3}{8}$ inch, or any other suitable conductive particles.

Each section of pipe was formed by wrapping resin-saturated bands (webs or tapes) 18 of continuous filaments in a helical pattern around a rotating mandrel (not shown). The winding path was a simple helix at an angle of about 54° to the mandrel axis of rotation. A uniformly reinforced pipe wall was thus formed by depositing the bands, first to the right along the mandrel and then the left to form overlapping layers. Each band included nineteen strands 19 (not shown in detail) of conventional continuous fiberglass filaments and one strand 20 of continuous conductive fiberglass filaments. The twenty strands formed a band approximately 2" wide. Each strand contained 15 "ends", and each "end" contained 408 individual filaments, making about 6,000 filaments per strand. The amount of conductive fiberglass filaments can be reduced by using more strands of conventional glass in a band for each strand of conductive filament. For example, the band width can be 5" instead of 2", while still using only one strand of conductive roving in the band. The conductive filaments may be of the type described in an article entitled, "Conductive Polymeric Compositions", by Donald M. Bigg, appearing in the December 1977 issue of *Polymer Engineering and Science*. Conductive filaments useful in this invention may also be obtained from MBA Associates. Such a product typically yields from 220 yards to 1,200 yards of strand per pound.

Figure 2:
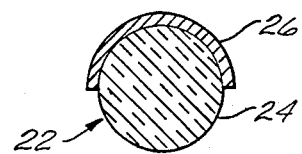
FIG. 2 is a cross-sectional view of a conductive glass filament used in making the pipe of this invention.

FIG. 2 shows a typical conductive filament 22 in cross-section. It includes a conventional cylindrical glass fiber 24 about 0.8 mil in diameter. A coating 26 of aluminum 0.1 mil thick is deposited on the glass fiber for its entire length, but extends only one-half way around the fiber so that only one-half the surface of the fiber is coated with aluminum. Of course, the conductive filaments can be entirely coated with aluminum, or any other suitable electrically conductive material.

The filaments used in this invention, both conductive and non-conductive, are continuous throughout the length of the article which they reinforce. Thus, the continuous conductive filaments have enormous aspect ratios (ratio of length to diameter) of 500:1, or greater. For example, a continuous conductive filament in a pipe section 20 feet long has an aspect ratio greater than 240,000:1. The filaments can be mineral fibers, such as glass or asbestos; animal fibers, such as wool; vegetable fibers, such as cotton; or synthetic fibers, such as nylon, rayon, dacron, orlon, and the like.

The resin or adhesive used to impregnate the band and coat the filaments can be any suitable thermosetting or thermoplastic resin used in winding or laminating procedures. For example, binders containing a thermosetting resin, such as epoxy, polyester, melamine-formaldehyde, urea-formaldehyde, phenol-formaldehyde, or the like, or binders containing a thermoplastic resin, such as polyvinyl chloride, polyvinylidene chloride, or the like can be used.

A pipe such as the one shown in FIG. 1 was made to have a nominal diameter of 2" (an average o.d. of 2.384" and an average i.d. of 2.098". The pipe included a conventional liner 28 with an average thickness of 0.023", thus giving an average reinforced wall thickness of about 0.15". The liner (known in the industry as C-veil reinforced liner) was impregnated with liquid resin and wound on the mandrel first, followed by two layers of the epoxy resin-saturated bands of conventional fiberglass filaments and conductive glass filaments. Each layer included two circuits, which each required one pass of a band in each direction along the mandrel. Thus, the pipe was made by first wrapping the mandrel with one pass of 10-mil C-veil material with a $\frac{3}{8}$ overlap. A first layer was then formed by making a pass in one direction with the band and then making a pass in the opposite direction to form a first circuit. An additional circuit was similarly formed to complete the first layer. Ultimately, two layers were formed to produce the final wall pipe thickness. In all, eight passes along the mandrel were required with the band to produce two circuits per layer, each circuit including a pass in each direction along the mandrel. Other methods and materials, well known to those skilled in making fiber-reinforced thermosetting plastic pipe, can be used.

After the pipe was formed, the resin was gelled under infrared lights, and then post-cured for one hour at 300° F.

The pipe contained approximately 2.9% conductive glass or about 0.4% metal by weight. The d.c. electrical resistance of the pipe tested in accordance with ASTM D257-76 was $8.3 \times 10^1$ ohms, which was well under the maximum resistance of $10^9$ ohms set by Lloyd's of London. A conventional fiberglass-reinforced plastic pipe made in exactly the same manner, except omitting the strand of conductive glass roving in the band used to build up the pipe wall, had a resistance of $2.68 \times 10^{12}$ ohms.

A similar conductive pipe was made as described above, except that it contains only 1.3% conductive glass, or about 0.2% metal by weight. It also had a resistivity well below the limit set by Lloyd's of London.

Figure 3:
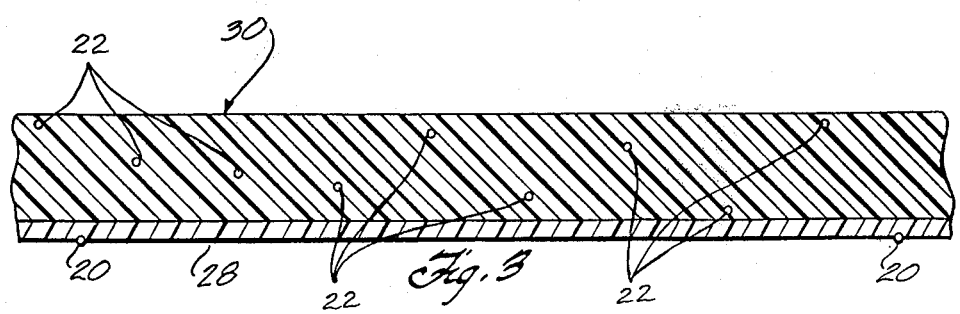
FIG. 3 is an enlarged cross-sectional view taken in the area of 3—3 of FIG. 1.

Since the C-veil material which lines the pipe interior does not include any electrically conductive filaments, its electrical resistivity is higher than that of the exterior surface of the pipe. For those applications where low resistivity is required for the pipe interior, and the chemical inertness of the C-veil material is not required, it can be omitted. Alternatively, a strand 20 (as shown in FIG. 3) of conductive filaments is wound around the mandrel before applying the C-veil liner 28 to increase the electrical conductivity of the inside surface of the pipe. The initial strand of conductive filaments and the C-veil liner are each saturated with liquid resin before being wrapped around the mandrel so they are bonded to each other when the resin is cured.

If the fiber-reinforced plastic material of this invention is used to make a sheet for radio frequency shielding, a procedure similar to that for making pipe is followed. However, the C-veil is omitted, and a first protective sheet (not shown) of polyethylene plastic (not shown), or any other suitable material to which the epoxy resin will not readily adhere, is first wrapped around the mandrel. Thereafter, a tubular laminate is formed around the mandrel exactly as described above. A second protective sheet (not shown) of polyethylene plastic is wrapped around the exterior of the laminate. Thereafter, and before the resin has set to a permanently rigid state, the second protective sheet and the wall of the laminate on the mandrel are cut through along a line extending substantially parallel to the longitudinal axis of the mandrel. Alternatively, the second sheet and laminate wall are cut through on a spiral path (or any other desired path) perpendicular to one set of the helices. The laminate is then removed from the mandrel as a flat sheet. The sheet is stored, in a refrigerated space if necessary, to prevent further curing of the resin until the sheet is to be formed into its final configuration. At that time, the sheet is forced into the desired shape, the protective sheets are removed, and the resin then cured to a rigid state. The product provides a shield against radio frequency radiation, even though it contains less than about 0.5% metal by weight.

The sheet form of the invention is as shown in detail in FIG. 3, except that the C-veil liner 28 is omitted. Thus, the sheet includes a wall 30 made up of epoxy resin and filaments of conventional fiberglass (not shown) and fiberglass filaments 22 coated with aluminum. For the sake of simplicity, only the strands of the conductive fiberglass filaments are shown.

FIG. 4 shows an alternate embodiment of this invention for making a pipe 39 to be used where there are restrictions on the amount of electrical charge which can be tolerated on the surface of plastic pipe, such as when the pipe is used in handling hydrocarbons, petrochemicals, and other inflammable fluids. Referring to FIG. 4, a tubular mandrel 40 is wrapped with one pass of 10-mil C-veil material 42 with a ⅔ overlap in a helical pattern as described above, except that the C-veil material is saturated with an electrically conductive resin, such as an epoxy resin carrying about 33% by weight of powdered carbon. Thus, the C-veil material forms a conductive liner for the inside surface of pipe.

The mandrel and C-veil material were then wrapped back and forth with a continuous band 44 of continuous glass filaments in a helical pattern at an angle of about 54° to the mandrel axis. The band included 12 strands 46 of conventional continuous fiberglass filament rovings or "ends", and one strand 48 of a roving or "end" of continuous conductive fiberglas filaments in the center of the band. The 13 strands formed a band approximately 1.2" wide. Each strand contained 15 rovings or "ends", and each "end" contained 408 individual glass filaments, making about 6,000 continuous glass filaments per strand. The band was wrapped back and forth around the mandrel in a series of helices and in a winding pattern requiring 3¼ circuits per layer so that the position of the conductive strand advanced ¼ of the band width in each layer until the pattern was completed at the end of the 13th circuit.

As shown in FIG. 4, the band was first wrapped from left to right to form a first helix 50 having adjacent turns 50A and 50B. The spacing between adjacent edges of turns 50A and 50B was equal to 2¼ times the width of the band. A similar helix (not shown) was wrapped from right to left around the mandrel so that the two passes back and forth along the mandrel completed a first circuit. For clarity of illustration, the second half of each circuit described below is not shown in FIG. 4.

A second helix 60 was wrapped from right to left around the mandrel so the trailing edge of the second helix was disposed adjacent the leading edge of the first helix. Only a first turn 60A of the second helix is shown in FIG. 4.

A third helix 64 was wrapped around the mandrel so that its trailing edge was adjacent the leading edge of the band of the second helix, and so that the leading edge of the third helix was spaced from the trailing edge of the second turn 50B of the first helix to leave a gap 65 having a width equal to ¼ the band width. Only a first turn 64A of the third helix is shown in FIG. 4.

A fourth helix 68 was wrapped around the mandrel so that the trailing ¼ of the helix filled the gap 65. The leading ¾ of the fourth helix 68 overlapped the trailing ¾ of the turns of the first helix.

Fifth, sixth, seventh, eighth, ninth, tenth, eleventh, twelfth, and thirteenth helices, 70, 72, 74, 76, 78, 80, 82, 84, 86, respectively, were serially wrapped as just described, and as shown in FIG. 4, so that the trailing edge of each helix was adjacent the leading edge of the preceding helix. Thus, the forward ½ of the seventh helix overlapped the trailing ½ of the first helix. The forward ¼ of the tenth helix overlapped the trailing ¼ of the first helix. The leading edge of the thirteenth helix terminated adjacent the trailing edge of the first helix to complete the winding pattern and total wall thickness of about 0.15".

In the resulting structure, the helices formed by the band in each layer were disposed in series side-by-side, and the side-by-side series, or the layers, were stacked to form the wall of the pipe. Accordingly, the conductive element in the band of each helix was progressively shifted ¼ of a band width from one layer (3¼ circuits) to the next. This provided a substantially uniform distribution of the conductive filaments throughout the wall thickness of the pipe, and substantially reduced the horizontal distance between adjacent conductive filaments compared to wrapping techniques in which the conductive filaments would be more or less superimposed throughout the wall thickness. This reduced spacing between adjacent conductive filaments was achieved without increasing the amount of conductive glass filaments and resulted in a finished pipe which rapidly dissipated electrical surface charges to low, safe values. Of course, the desired distribution of electrical conductors can be achieved by any of many other winding patterns.

After the wrap was complete, the resin was cured to form a pipe with a fluid-impermeable wall, and the pipe was removed from the mandrel.

If desired, a moldable sheet of the material, formed as described with respect to FIG. 4, could be formed by cutting the wound material from the mandrel and used as described above.

As indicated above, the helices formed during the second half of the circuits are not shown in FIG. 4.

However, in the actual pipe, these helices criss-cross with those shown to form many electrical contacts where the conductive filaments cross each other. Moreover, the conductive filaments in the first three or four helices wrapped on the mandrel make good electrical contact with the conductive liner. Accordingly, the conductive filaments are distributed substantially uniformly throughout the thickness of the fluid-impermeable wall and over its outer surface so that electrical charges built up anywhere in the wall are quickly dissipated when the pipe is properly grounded, because the pipe acts almost as if it were made entirely of electrically conductive material from its inner to its outer surface.

Thus, if a large electrical charge should build up on the interior of the pipe, say due to static electricity from fluid flowing through the pipe, the outer face of the pipe may be shielded from electrical discharge by grounding it. For example, the pipe made as described above with respect to FIG. 4 was tested by placing a charge of 4,000 volts on the interior of the pipe in an ungrounded condition. The voltage on the exterior surface of the pipe was 3,800 volts with the pipe ungrounded. When the pipe exterior was grounded, and with a charge of 4,000 volts maintained on the interior surface of the pipe, the voltage on the outer surface fell immediately to 15 volts, which is an acceptable value in the industry. The 3,800 volts are not acceptable.

From the foregoing description, it will be apparent that the process and plastic article of this invention can be used to make a great variety of electrically conductive articles, including pipe and shaped members, such as pipe fittings, structural members, and the like.

The surprising result of this invention is that although the continuous conductive filaments form such a small part of the total article, and even though the conductive filaments are coated with non-conducting cured resin, the final product was an exceptionally low surface resistivity, which makes it ideal to use in those applications where the buildup of electrostatic charges cannot be tolerated. The product also provides r-f shielding, even though it contains so little metal.

I claim:

1. A filament-reinforced plastic conduit having a relatively low electrical resistivity, the conduit comprising a fluid-impermeable tubular wall made of filaments coated with plastic, a major portion of the filaments being electrically non-conductive, and a minor portion of the filaments being electrically conductive and being distributed substantially uniformly throughout the wall thickness, the filaments being disposed along helical paths wound in opposite directions in successive layers in the tubular wall so each layer contains conductive filaments and so the conductive filaments in adjacent layers form a crisscross pattern and make electrical contact at the points where they cross.

2. An article according to claim 1 in which between about 2% and about 8% of the filaments in each layer are electrically conductive.

3. An article according to claim 1 in which the conductive filaments are continuous throughout substantially the entire length of the article.

4. An article according to claim 1 or 2 which has a resistivity of less than $10^9$ ohms when tested in accordance with ASTM D257-76.

5. An article in accordance with claim 1 in which the conductive filaments are nonconducting fibers coated with an electrically-conductive material.

6. A filament-reinforced plastic pipe having relatively low electrical resistivity, the pipe including a fluid-impermeable tubular wall made of filaments coated with plastic, a major portion of the filaments being electrically nonconductive, a minor portion of the filaments being electrically conductive and distributed substantially uniformly throughout the wall, a sheet of liner material bonded to the interior surface of the pipe wall, the filaments being disposed along helical paths wound in opposite directions in successive layers in the tubular wall so each layer contains conductive filaments and so the conductive filaments in adjacent layers form a crisscross pattern and make electrical contact at the points where they cross, and a strand of electrically conductive filaments bonded to the inside surface of the liner material and thus be in contact with fluid in the pipe.

7. A method for making a filament-reinforced plastic article with a fluid-impermeable wall, the method comprising wrapping a band of plastic-coated elongated filaments in the shape of a plurality of series of helices around a mandrel in at least one direction to form a tubular article, a major portion of the filaments in the band being electrically nonconductive, a minor portion of the filaments in the band being electrically conductive, the helices in each series being disposed side-by-side to form a respective layer, and the series of helices forming the layers being stacked to form the wall thickness, the adjacent stacked layers of the helices wound in the same direction including at least one conductive filament, the conductive filaments in those adjacent stacked layers being laterally spaced from each other, and thereafter curing the plastic to form a solid fluid-impermeable wall.

8. A method according to claim 7 which includes the step of wrapping the bands around the mandrel in overlapping patterns.

9. A method according to claim 7 in which a continuous conductive filament is disposed in each helix.

10. A method according to claim 7 which includes the step of cutting through the tubular article on the mandrel to form a sheet, and thereafter removing the sheet from the mandrel.

11. A filament-reinforced plastic article having a relatively low electrical resistivity, the article comprising a fluid-impermeable wall made of a plurality of a series of bands of plastic-coated elongated filaments, the bands in each series being disposed side-by-side to form respective layers and the series of bands being stacked in layers to form the wall thickness, the bands in at least some of the layers extending in the same direction as the bands in other layers, a major portion of the filaments in each band being electrically nonconductive, a minor portion of the filaments in the stacked bands being electrically conductive, the conductive filaments in adjacent layers with stacked bands extending in the same direction being laterally spaced from each other, the plastic and the filaments being bonded together to form the fluid-impermeable wall with the electrically conductive filaments distributed substantially uniformly throughout the thickness of the wall.

12. An article according to claim 11 in which the electrically conductive filaments are glass filaments coated with metal.

13. An article according to claim 11 or 12 in which each band includes at least one conductive filament.

14. An article according to claim 11 or 12 which includes an electrically conductive coating on one face of the wall and in contact with at least some of the conductive filaments in the wall.

15. An article according to claim 11 or 12 in which the bands are in the shape of helices, and the wall is in the shape of a tube to form a pipe.

16. An article according to claim 11 or 12 in which the article is a series of elongated tubes fitted together at their adjacent ends, and an electrically conductive adhesive bonding the adjacent ends of the tubes together to form a conduit.

* * * * *